United States Patent
Luzzi et al.

(10) Patent No.: US 7,720,896 B2
(45) Date of Patent: May 18, 2010

(54) METHOD AND APPARATUS FOR POST-PROCESSING A RAW BIT SEQUENCE OF A NOISE SOURCE

(75) Inventors: Raimondo Luzzi, Graz (AT); Marco Bucci, Graz (AT)

(73) Assignee: Infineon Technologies AG, Neubiberg (DE)

( * ) Notice: Subject to any disclaimer, the term of this patent is extended or adjusted under 35 U.S.C. 154(b) by 1017 days.

(21) Appl. No.: 11/422,296

(22) Filed: Jun. 5, 2006

(65) Prior Publication Data

US 2007/0282934 A1 Dec. 6, 2007

(51) Int. Cl.
*G06F 7/58* (2006.01)
(52) U.S. Cl. ..................................... 708/250
(58) Field of Classification Search .................. None
See application file for complete search history.

(56) References Cited

U.S. PATENT DOCUMENTS 7,194,496 B2 * 3/2007 Morris ....................... 708/250
2003/0023647 A1 * 1/2003 Epstein ....................... 708/250
2003/0236803 A1 * 12/2003 Williams ..................... 708/252
2005/0283507 A1 * 12/2005 Souvignier et al. .......... 708/250
2007/0043797 A1 * 2/2007 Luzzi et al. ................. 708/250
2007/0244950 A1 * 10/2007 Golic ......................... 708/250
2008/0258825 A1 * 10/2008 Gressel et al. ................ 331/78

FOREIGN PATENT DOCUMENTS

EP 1 223 506 A1 7/2002
EP 1 450 251 A2 8/2004

OTHER PUBLICATIONS

Marco Bucci, et al., "Design of Testable Random Bit Generators," Infineon Technologies Austria AG.

* cited by examiner

*Primary Examiner*—David H Malzahn
(74) *Attorney, Agent, or Firm*—Dickstein, Shapiro, LLP.

(57) ABSTRACT

An apparatus for post processing a raw bit sequence generated by a noise source, comprises a derivation unit for deriving a random word from each bit sequence input into the derivation unit and a skip unit for skipping skip sequences of consecutive bits of the raw bit sequence and inputting intervening sub-sequences of bits of the raw bit sequence between the skip sequences into the derivation unit.

25 Claims, 5 Drawing Sheets

US 7,720,896 B2

METHOD AND APPARATUS FOR POST-PROCESSING A RAW BIT SEQUENCE OF A NOISE SOURCE

BACKGROUND OF THE INVENTION

The present invention relates to a method and an apparatus for post-processing a raw bit sequence of a noise source.

A random number generator generates an output signal, which consists of a sequence of random numbers, typically represented by a random bit stream. Random number generators can be grouped into pseudo random number generators and true random number generators. In pseudo random number generators, random numbers are generated out of an initial state, the so-called seed, by applying a predetermined algorithm. As a result, uniformly distributed random numbers are achieved. However, given the complete knowledge of the generator structure and previously generated random number sequences, it is possible to predict following random numbers. That is, pseudo random number generators lack independence between consecutively generated random words.

The lack of independence is not acceptable in sensible security applications, in which an observer or even attacker must not be able to carry out any useful predictions about the output of the random number generator—even if the design of the random number generator is known. For true random number generators, the generated random numbers are not predictable, i.e. the above requirement is fulfilled. In a true random number generator, the random bit stream is generated from a non-deterministic natural source like electronic noise. One possible non-deterministic natural source is for example a sampling of a jittered oscillator, the corresponding hardware producing random numbers to a very high rate.

Although natural sources exhibit, in principle, true randomness, in concrete technical realizations the statistical quality of the generated random numbers is limited due to bandwidth limitation, fabrication tolerances, aging and temperature drifts. To improve the statistic quality, i.e. to get closer to true randomness, a digital post-processing device conventionally follows the non-deterministic noise source. This post-processing generates random words from consecutive sub-sequences of the sequence of random numbers and normally involves also a compression of the bit stream, i.e. the output random word comprises fewer bits than the input sub-sequence of bits used therefore.

Among noise sources, one distinguishes memory-less or state-less noise sources from noise sources which keep to a certain degree the memory to previously generated bit sequences and hence are not memory-less. Under the hypothesis of independence of the input raw sub-sequences coming from a memory-less noise source, a conventional compression algorithm guarantees the independence of the generated random words, thus allowing the verification of a minimal entropy limit directly after the post processor. If, however, the available noise source is not memory-less (for example if a feedback strategy to improve the robustness against technological and environmental variation is employed), the conventional approach is not sufficient to prove that the output (compressed) random words are independent. An example for a not memory-less noise sources is an offset compensated oscillator-based random bit generator.

BRIEF SUMMARY OF THE INVENTION

In accordance with a first aspect, the present invention provides an apparatus for post processing a raw bit sequence generated by a noise source. It comprises a deriving means for deriving a random word from each bit sequence input into the deriving means and a skipping means for skipping skip sequences of consecutive bits of the raw bit sequence and inputting intervening sub-sequences of bits of the raw bit sequence between the skip sequences into the deriving means.

In accordance with a further aspect, the present invention provides an apparatus for generating a random word. It comprises a noise source comprising a raw bit sequence output, a skip unit comprising an input coupled to the raw bit sequence output and an output. The apparatus comprises moreover a compressor comprising an input coupled to the output of the skip unit and a random word output.

In accordance to a further aspect, the present invention provides a random word generator. It comprises a noise source comprising a raw bit sequence output and being operative in a manner, which may be modeled by a discrete time homogeneous Markov chain model, a feedback shift register comprising a reset input, a data input and a data output and a multiplexer comprising a control input, a fixed signal input, a raw bit sequence input coupled to the raw bit sequence output and a multiplexer output coupled to the data input of the feedback shift register. It comprises moreover a controller comprising a first control output coupled to the reset input of the feedback shift register, and a second control output coupled to the control input of the multiplexer and being operative in cycles so that, in a preceding cycle, the feedback shift register is reset and the multiplexer provides a first sub-sequence of bits of the raw bit sequence from the raw bit sequence input to the multiplexer output and couple the fixed signal input with the multiplexer output during a skip sequence of consecutive bits following the first sub-sequence, and, in a subsequent cycle, the feedback shift register is reset and the multiplexer provides a second sub-sequence of bits of the raw bit sequence following the skip sequence from the raw bit sequence input of the multiplexer output, wherein data at the data output of the feedback shift register resulting from the first sub-sequence of bits represents a first random word of the preceding cycle and data at the data output of the feedback shift register resulting from the second sub-sequence of bits represents a second random word of the subsequent cycle.

In accordance with a further aspect, the present invention provides a method for post processing a raw bit sequence generated by a noise source. It comprises the steps of skipping skip sequences of consecutive bits of the raw bit sequence and deriving random words from sub-sequences of bits of the raw bit sequence between the skip sequences.

In accordance with a further aspect, the present invention provides a method for generating random words by means of a noise source activatable to generate a raw bit sequence in a manner, which may be modeled by a discrete time homogeneous Markov chain model, a feedback shift register being resettable, and a multiplexer. In a first cycle, it comprises the steps of resetting the feedback shift register, of controlling the multiplexer to input a first sub-sequence of bits of the raw bit sequence into a data input of the feedback shift register and of inputting a fixed signal into the data input of the feedback shift register during a skip sequence of consecutive bits following the first sub-sequence of bits. In a second cycle, it comprises the steps of resetting, in a second cycle, the feedback shift register and of controlling the multiplexer to input a second sub-sequence of bits of the raw bit sequence following the skip sequence into the data input of the feedback shift register, wherein data at a data output of the feedback shift register resulting from the first sub-sequence of bits a first random word for the first cycle and data at the data output of the feedback shift register resulting from the second subsequence as a second random word for the second cycle.

In accordance with a further aspect, the present invention provides a computer program with a program code to execute, if the computer program is executed on a computer, for a method for post processing a raw bit sequence generated by a noise source. It comprises the steps of skipping skip sequences of consecutive bits of the raw bit sequence and of deriving random words from sub-sequences of bits of the raw bit sequence between the skip sequences.

An advantage of an embodiment of the present invention is that the noise source used for generating the random bit stream does not have to be memory-less in order to achieve a sufficient degree of independence of the generated random words. A further advantage of an embodiment of the present invention is that the verification of a minimal entropy limit of the random words generated is sufficient to check the correct functionality of the random word generation.

BRIEF DESCRIPTION OF SEVERAL VIEWS OF THE DRAWINGS

Preferred embodiments of the present invention are described hereafter making reference to the appended drawings. Features of the invention will be more readily appreciated and better understood by reference to the following detailed description, which should be considered with reference to the accompanying drawings, in which.

DETAILED DESCRIPTION OF THE INVENTION

Figure 1:
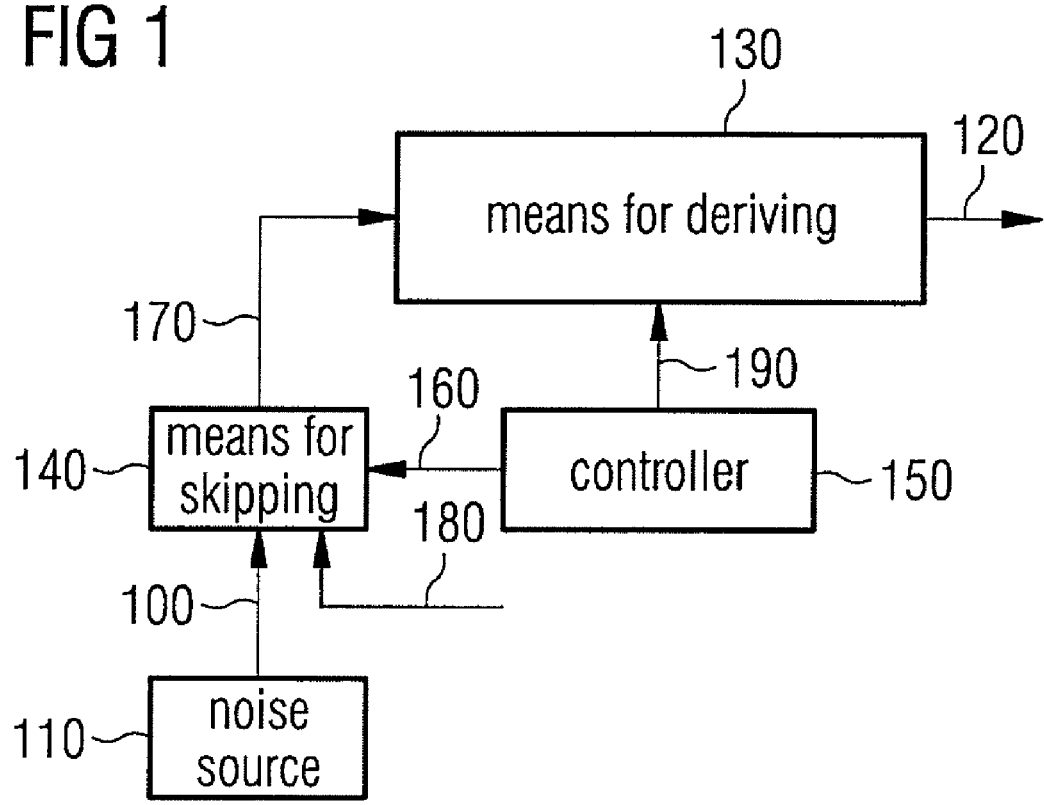
FIG. 1 shows a schematic view of an apparatus for post processing a raw bit sequence of a noise source according to an embodiment of the present invention.

FIG. 1 shows an apparatus for post-processing a raw bit sequence 100 from a noise source 110 in order to generate a random word readable at an output 120. It comprises a means for deriving 130, a means for skipping 140, and a controller 150.

The noise source 110 generates the raw bit sequence 100, which is input into the means for skipping 140, which in turn is controlled by the controller 150. Upon the controller 150 sending a skip signal 160 to the means for skipping 140, the means for skipping 140 inputs into the means for deriving 130, as part of an input signal 170, a sequence of fixed bits 180, the number of fixed bits or the duration of the application of the skip signal 160 being controlled or set by the skip signal 160. In the meantime, bits of the raw bit sequence 100 input into the skipping means 140 are skipped or discarded by the skipping means 140. In the absence of the skip signal 160 from the controller 150, the means for skipping 140 forwards a subsequence of bits of the raw bit sequence 100 following the just skipped sequence of bits from the noise source 110 to the means of deriving 130. Thus, per cycle, the input signal 170 input into the means for deriving 130 comprises the sequence of fixed bits 180, whose number of bits is set by the skip signal 160, and a subsequence of raw bit sequences 100. The controller 150 is designed to cyclically repeat the control of the means for skipping 140, so that each cycle comprises the application of a subsequence of the raw bit sequence 100 and the application of a subsequence of fixed bits 180 to the deriving means 130.

Preferably, the controller 150 resets the means of deriving 130 by a reset signal 190 in each cycle before the means for skipping 140 sends the next subsequence of the raw bit sequence 100 to the means of deriving 130 so that the derivation of the next random word by the means for deriving 130 from the next sub-sequence is independent from previous raw bit sub-sequence input into the deriving means. The time of reset could be immediately before the means of deriving 130 receives and processes the bit sequence or at the beginning of the skip signal 160. In each cycle, the means for deriving 130 outputs a random word. Each random word output has been derived by use of, at least, all bits of the corresponding sub-sequence of bits input into the means for deriving 130 in this cycle, and, possibly, all or some of the fixed bits of the skip sequence 160 belonging to the same cycle and preceding or succeeding this sub-sequence. Resetting the means for deriving 130 by the reset signal 190 improves the statistic quality of the generated random words, since a previously generated random word cannot interfere the generation of the random word in a current cycle. Thereby, the correlation between successively generated random words is eliminated and the statistic quality of the generated random words is improved as will be outlined in more detail below.

According to an embodiment of the present invention, the fixed signal 180 input into the means for deriving 130 does not influence the generation of a random word in the means for deriving 130. That is, the fixed bit sequence 180 could be a sequence of all zeros, for example. This implies that the means for deriving 130 may operate in a free or undisturbed mode during these periods of receipt of fixed bits, the number of subsequent fixed bits being set by the skip signal 160 sent by the controller 150 as mentioned above. Alternatively, the influence is of static nature compared to the application of a constant logical null signal at the data input of the means for deriving 130. That is, the fixed bit sequence 180 could be a run of logical ones.

Due to the existence of these skip sequences 160 between the random word derivations the noise source 110, needs not to be memory-less. Recall, the statistic quality measures the randomness of a bit stream, i.e. the better the randomness the better the statistic quality. Due to the skip sequences 160, the noise source 110 runs a sufficient number of clock cycles or bits, respectively, in order to meet a sufficient statistic quality of the raw bit sequence 100. This number of raw bits is set by the skip sequence 160. The higher this value the better the quality. There are mathematical models for such not memory-less noise sources. A discrete time homogeneous Markov chain model represents an example. For this mathematical model, the following description describes a possible sending for the number of bits to be skipped per skip sequence or cycles, respectively.

Figure 2:
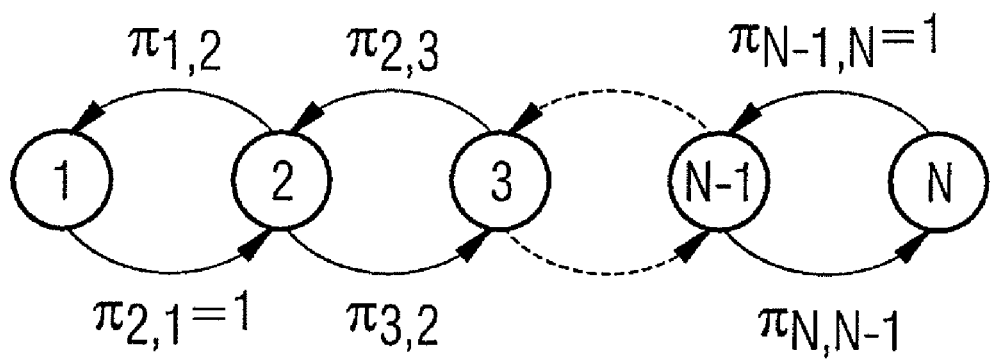
FIG. 2 shows a schematic view of an $N_q$-state Markov chain model for a noise source which may be used in the apparatus of FIG. 1.

A discrete time homogeneous Markov chain model describes state transitions and FIG. 2 depicts a state diagram with $N_q$-states representing the operation of an exemplary noise source. The states shall represent the states of the noise source, which is assumed here to be non-memoryless. FIG. 2 shows the states 1 ... $N_q$ and the probability of the transition between next neighbor states. These probabilities are given by matrix elements of a one step transition matrix Π, wherein the matrix coefficients $\pi_{l,k}$ represents the transition probability from a state l to a state k with (l,k) ∈ [1, $N_q$] and are defined by:

$$\pi_{l,k}=P\{q(i+1)=l|q(i)=k\}, \forall (l,k)\in[1,N_q],\quad(1)$$

where q(i), q(i+1) are the current and the next states respectively, and wherein the following constraints are fulfilled by the probabilities P:

$$\begin{cases} \pi_{1,1}=0, \forall l \in [1, N_q] \\ \pi_{l,k}=0, \forall (l,k) \in [1, N_q] \times [1, N_q] | l \neq k+1 \vee l \neq k-1 \\ \pi_{l+1,l} + \pi_{l-1,l} = 1, \forall l \in [2, N_q - 1] \\ \pi_{2,1} = 1 \\ \pi_{N_j,1,N} = 1 \end{cases} \quad(2)$$

For the n-step transition matrix $\Pi^n$, it can be easily verified that as n→∞, even and odd columns of $\Pi^n$ approach two different stationary distributions $\pi^*_e$, $\pi^*_o$ thus showing that the process maintains the memory of the starting state parity. In fact, if the starting state is even (odd), after an even (odd) number of steps, the process is in an even state. Similarly, the final state is odd if the starting one is odd (even) and an even (odd) number of steps are performed. In this regard, even (odd) states shall indicate the states denoted with even (odd) numbers in FIG. 2.

Figure 3:
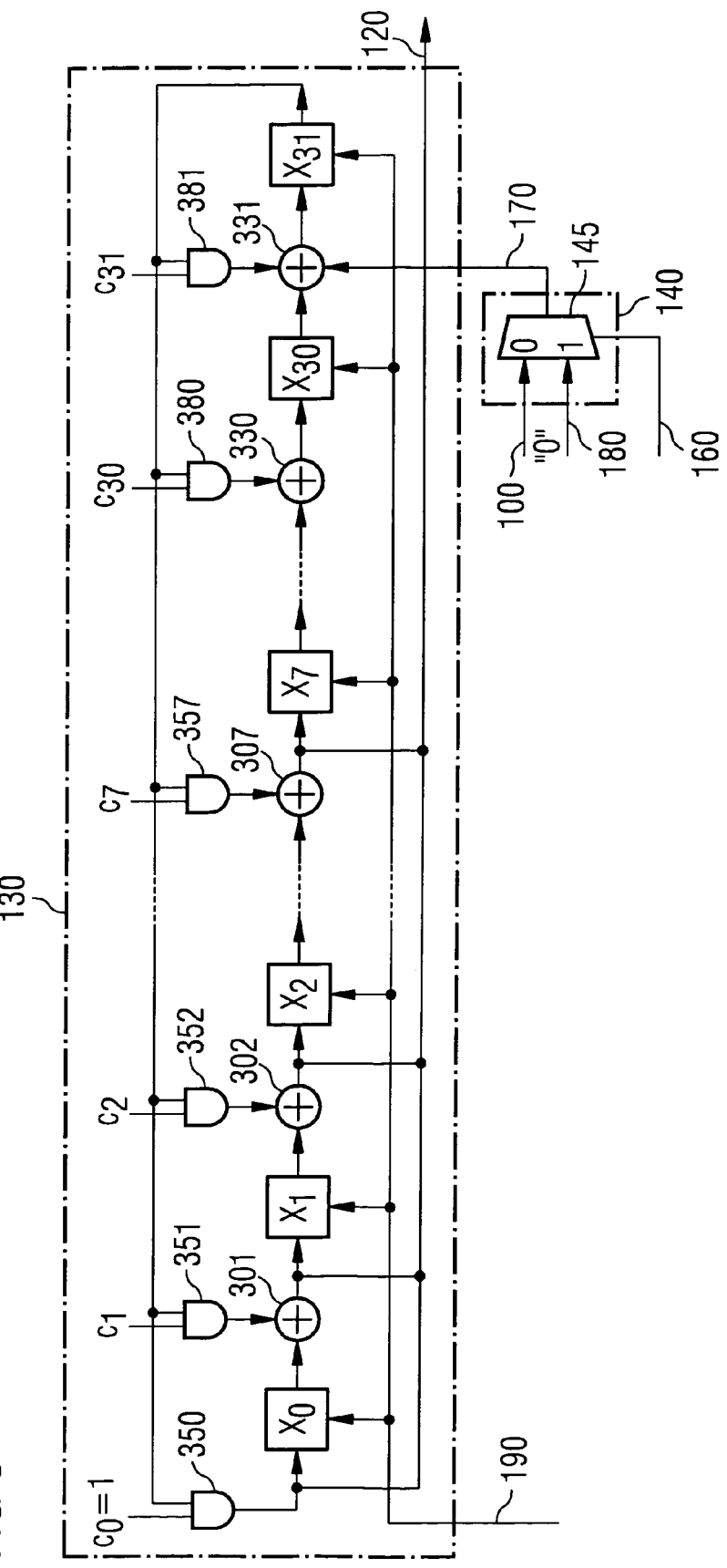
FIG. 3 shows a schematic view of an apparatus for post-processing a raw bit sequence of a noise source according to an embodiment of the present invention.

In order to obtain the same parity for both the initial and the final state, an even number of steps is preferably performed, i.e. an even number of bits is preferably processed in the means for deriving 130, i.e. a post-processor as for example a LFSR as discussed at FIG. 3. In other words, the cycle length in the apparatus of FIG. 1 is preferably equal to an even number of bits of the raw bit sequence. Moreover, in order to ensure the independence or a sufficient independence of the consecutive input sub-sequences extracted from the raw bit sequence 100 generated by the Markov model, an $L_{skip}$-bit gap, i.e. $L_{skip}$-bit long skip sequence, between two successive sub-sequences is inserted thus reducing their correlation below an assumed limit. In other words, when an output random word is ready, such as because enough entropy has been collected in the means for deriving 130, further $L_{skip}$-bits are generated by the noise source 110, which are skipped and do not enter the means for deriving 130. This $L_{skip}$-bit gap is set by the skip signal 160 of the controller 150.

The gap length $L_{skip}$ may be defined as and set to the minimum number of steps for which the even and odd columns of $\Pi^n$ differ for less than an acceptable error, which can be 1% or more preferably 0.1%. Actually, after $L_{skip}$-bits, the probability of each state q ∈ [1, $N_q$] is up to a certain accuracy independent from the initial state and, therefore, a new subsequence extracted from the raw bit stream 100 to be processed in the means for deriving 130 can be assumed independent to a certain degree from the previous one. Hence, $L_{skip}$ as given by the skip signal 160, sets the degree of independence.

FIG. 3 shows a more detailed implementation of another apparatus for post-processing a raw bit sequence 100 of a noise source 110. However, in FIG. 3, the noise source 110 and the controller 150 are not depicted. Rather, the means for deriving 130 and the means for skipping 140 are shown. The means for deriving 130 comprises a serial input for the bit sequence 170, a reset input for the reset signal 190, and the output 120 for the random words. The means for skipping 140 comprises a multiplexer 145 comprising an input for the raw bit sequence 100, an input for the fixed signal 180, an input for the skip signal 160, and an output for the bit sequence 170.

In this embodiment of the present invention, the means for deriving 130 comprises a linear feedback shift register (LFSR) comprising 32 memory cells, which are serially connected via 30 logic XOR 301, 302 ... 307 ... 330 gates and an ADD modulo 2 gate 331, respectively. The output of the last memory cell $X_{31}$ is fed back via a feedback line to a first input of 31 AND gates 351 ... 381, the outputs of which are connected to another input of a respective one of the logic XOR gates 301 ... 330 and the ADD modulo 2 gate 331, respectively, as well as to a first input of another AND gate 350, the output of which is connected to the input of the first register $X_0$. The second input of the AND gates 350 ... 381 form another 31-bit control input of the LFSR for setting the connection polynomial of the LFSR with the exemplary constraint that $c_0$=1, i.e. the control bit applied to ADD gate 350 is one, so that the output signal of $X_{31}$ is fed back to the input of $X_0$ in any case, independent of the specific control word $c_1$ ... $c_{31}$. In other words, the LFSR feedback is mediated by the logic AND gates 350 ... 381, whose behavior, i.e. passing or blocking the feedback output signal of $X_{31}$ to the respective XOR gate, is set by the input signals $c_0$ ... $c_{31}$. Preferably, this setting is fixed. Each memory cell $X_0$ ... $X_{31}$ further comprises a reset input for the reset signal 190 and is designed to reset its current state to a predetermined one upon receipt of the reset signal 190. The predetermined reset state of the register $X_1$ ... $X_{31}$ may all be one or may be a combination of zeros or ones. As described so far, each of the gates 301 ... 331 has one input connected to an output of one of the registers $X_0$ ... $X_{30}$, and another input connected to an output of one of the AND gates 350 ... 381. However, additionally, gate 331 connected between the registers $X_{30}$ and $X_{31}$ has another input, which is connected to the output of the multiplexer 145, thereby representing the serial input of the LFSR and the only part for influencing the mode of operation of LFSR from outside. As is readily understood, gate 301 acts as a XOR gate in case that a logical zero is applied to the serial input of the LFSR such that this condition represents the LFSR running in a free mode. The output 120 for the random words is, in this example, 8-bit wide and formed by the input of the first eight memory cells $X_0$ ... $X_7$. The post-processing performed by the deriving means 130 yields a compression, that means the output random word 120 comprises fewer bits than the portion of the input sub-sequence of bits 170 originating from the raw bit sequence 100, which has been operative in influencing the random word, as will be described in more detail below.

The generation of a new random word starts with the application of the reset signal 190 to clear all memory cells $X_0$ ... $X_{31}$ to a predetermined state. The controller 150, not shown in this figure, then sets the multiplexer 145 into a state in which the raw bit sequence 100 is input into the feedback shift register 130 and applied to gate 331, respectively, by setting the skip signal 160 to a logical zero. As long as the skip signal 160 remains zero, the consecutive bits of the raw bit sequence 100 enter the feedback shift register 130 at the logic gate 331 between the memory cells $X_{30}$ and $X_{31}$, thereby consecutively influencing the content of memory cells $X_1$ to $X_{30}$ via $X_{31}$, the feedback loop to all AND gates 350 ... 381 and especially via the AND gate 350. Depending on the selectable input values $c_1$ ... $c_{31}$ for the logic AND gates 351 ... 381, the logic AND gates 351 ... 381 are open or closed, i.e. they pass the feedback signal output by $X_{31}$ or block it. The LFSR is preferably clocked synchronous to the clock rate at which the bits of the raw bit sequence 100 arrive at the multiplexer 145, thereby involving the consecutive bits of the raw bit sequence 100 into the update process of the register state of registers $X_0 \ldots X_{31}$.

This process of inputting and processing bits from the raw bit sequence 100 continues until the controller 150 switches the skip signal 160 to a logical 1.

The time controller 150 switches the skip signal 160 to a logic 1 as soon as the LFSR has processed or compressed enough consecutive bits of the raw bit sequence 100 input into the LFSR since the last reset of the LFSR, so that a sufficient entropy of the 8-bit word residing in the registers $X_{31}, X_0, \ldots, X_6$ is achieved. Examples for the number of consecutive bits of the raw bit sequence 100 input into LFSR prior to the switching of the skip signal to a logical 1 may be within a range from 16 to 64.

At the time, this skip signal 160 switches to a logical 1, the multiplexer 145 effectively blocks sending off or disregards further bits from the raw bit sequence 100 and instead sends the fixed signal 180 to the LFSR. The controller 150 maintains the skip signal 160 at a logical 1 for a number of clock cycles of the LFSR, which is equal or greater than the aforementioned gap length $L_{skip}$. In a preferred embodiment, the word available at the output 120 at the end of the time interval in which the skip signal 160 is 1 is used as the new random word, i.e. the content that is input into the memory cells $X_0 \ldots X_7$ in the last clock cycle of the skip signal 160 being one period. Alternatively, the random word can be read out before the skip sequence, i.e. the sequence of skip signal 160 beeing 1, is completed. In this regard, it would further be possible to read out the bits of the new random word serially, for example, by connecting the output 120 just with the input of $X_0$.

In other words, FIG. 3 shows a 32-bit LFSR featuring a reset input signal 190 to clear the post-processor memory $X_0$ to $X_{31}$, when a new cycle or compression starts, and consecutive bits of the raw bit sequence 100 are input. During compression, a sequence of raw bits 100 from the noise source 110 enter the LFSR while, during the $L_{skip}$-bit gap between two successive cycles or compression, the LFSR evolves in free mode (data input 170 set to logic 0). An output random word 120 comprises exemplary one byte and is extracted from the first 8 memory cells.

Figure 4:
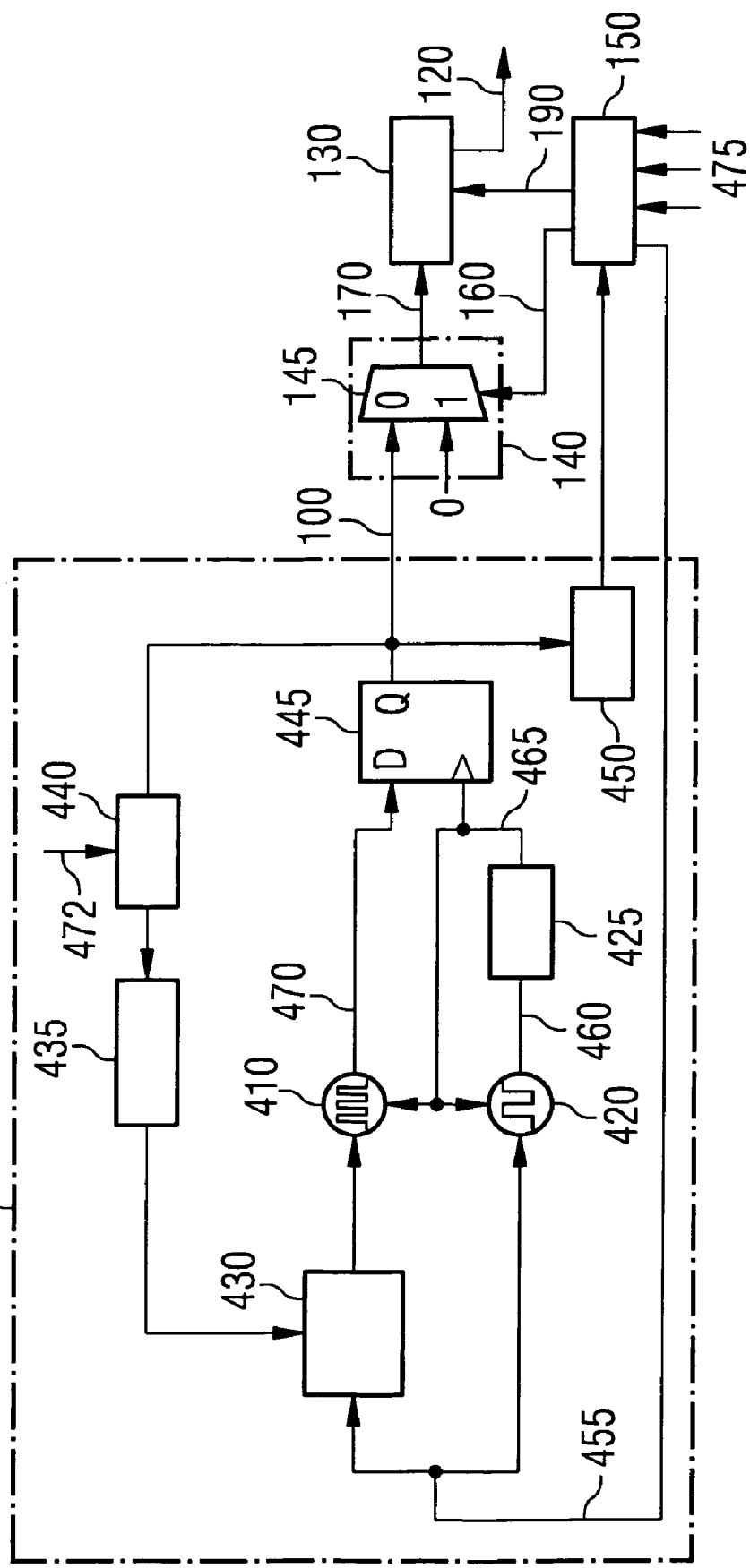
FIG. 4 shows a schematic view of an apparatus for post-processing a raw bit sequence of a noise source including an exemplary noise source according to an embodiment of the present invention.

The Markov chain model as explained in FIG. 2 provides a mathematical model for a noise source, which is not memoryless, that means in this model, the memory of the initial state is kept up to a certain degree. FIG. 4 shows a concrete realization of such a noise source 110 along with a means for deriving 130, a multiplexer 145 and a controller 150 according to a further embodiment of the present invention. In the depicted example, the noise source 110 is based on a jittered oscillator comprising two oscillators, a fast oscillator 410 and a slow oscillator 420. Moreover, the noise source 110 comprises a prescaler 425, a delayer 430, a mean value calculator 435, a speed control 440, a flip-flop acting as a sampler 445 and a transition counter 450. Apart from jittered oscillators, examples for relevant natural noise sources comprise: elapsed time between emission of particles during radioactive decay, thermal noise from a semiconductor diode or resistor or sound noise from a microphone or video input from a camera.

In the jittered oscillator example used here, the fast oscillator 410 is designed to output a fast clock signal 470, the slow oscillator 420 is designed to output a slow clock signal 460, the prescaler is designed to scale an input signal by a certain factor, the delayer 430 is designed to (shift an input signal by a certain time period, the transition counter 450 is designed to count subsequent cycles and to output this number to the controller 150 and the sampler 445 is designed to sample the output signal from the fast oscillator 410 with a sample signal 465. The speed control 440 is designed to change the speed of the feedback loop by a rate 472, and the mean value calculator 435 calculates from an input a mean value.

Both oscillators are started by a starting signal 455, which is initiated from the controller 150. In this example, the fast oscillator 410 starts with a delay set by the delayer 430. This delay is a certain time period, which is calculated by the mean value calculator 435. The slow oscillator has no delay for the starting time and its output 460 is prescaled by the prescaler 425 to yield the sampling signal 465. This prescaling means that the time period is changed appropriately. The obtained sampling signal 465 is then input into a clock input of the flip-flop sampler 445. The output of the fast oscillator 410 is connected with another input, the data-input, of the flip-flop sampler 445. Both oscillators are stopped by the sample signal 465. The flip-flop sampler 445 provides as output the raw bit sequence 100 and is connected with the multiplexer 145 as well as with the transition counter 450, and in addition with the speed control 440. The output of the speed control 440 is connected with the mean value calculator 435. With this mean value, the delayer 430 determines an adjusted delay value that means a time period, for starting the fast oscillator 410 again. This delay value is important for the statistic quality of the resulting raw bit sequence 100 (see below in the context of the FIG. 5 and FIG. 6).

This noise source 110 operates with a certain clock speed. If the prescaler 425 has generated an output signal, this output signal will immediately stop again the oscillators. At the same time, the signal will be used in the flip-flop sampler 445 and an output signal will be counted at the transition counter 450.

A new cycle starts after each sampling and the number of cycles is counted by the transition counter 450 and is sent to the controller 150. After each transition, the controller 150 sends the start signal 455 in order to start the oscillators 410, 420 again, which have been stopped by the stop signal 465. As long as the number of transitions is smaller than the $L_{skip}$-bit gap, which comprises the length of the skipping sequence 160, the controller 150 leaves the skipping sequence 160 to a logic 1, so that the multiplexer 145 inputs the fixed signal 180 into the means of deriving 130. In this example it comprises a series of logic 0. If the number of transitions is bigger or equal to the $L_{skip}$-bit gap, the controller 150 switches the skipping signal 160 to a logic 0 and the multiplexer 145 forwards the raw bit subsequence 100 to the means for deriving 130. The additional input 475 into the controller 150 comprises for example the minimal number of transitions, i.e. the $L_{skip}$-bit gap, corresponding to the length of the skipping sequence 160.

In this conventional noise source, the feedback loop from the flip-flop sampler 445 a back reaction is provided due to the means for changing the speed 440 and the means for determining a mean value 435 to the delayer 430 and hence it exhibits a correlation between generated bits. The consequence of this feedback loop is, that this process keeps a certain memory or correlation between the generated random numbers and hence this, example for the noise source 110 is not memory-less. As it will be discussed in more detail with FIG. 5 and FIG. 6, this correlation is especially severe as long as the edges of the fast clock signal 470 and the sampling signal 465 are not yet aligned. The purpose of this feedback loop is to get with each cycle closer and closer to the state where both edges are aligned. Therefore, in order to guarantee that a correlation between successive sub-sequences of the raw bit sequence 100 are below an acceptable limit the skip length $L_{skip}$ of the skip sequence 160 in preferred embodiments is chosen appropriately. The longer this gap, the closer get the edges of the clock signals 465, 470 and the better is the randomness of the raw bit sequence 100. This ensures in turn the randomness of the generated random words at the output 120 up to an acceptable accuracy so that the minimal entropy requirement is fulfilled.

Figure 5:
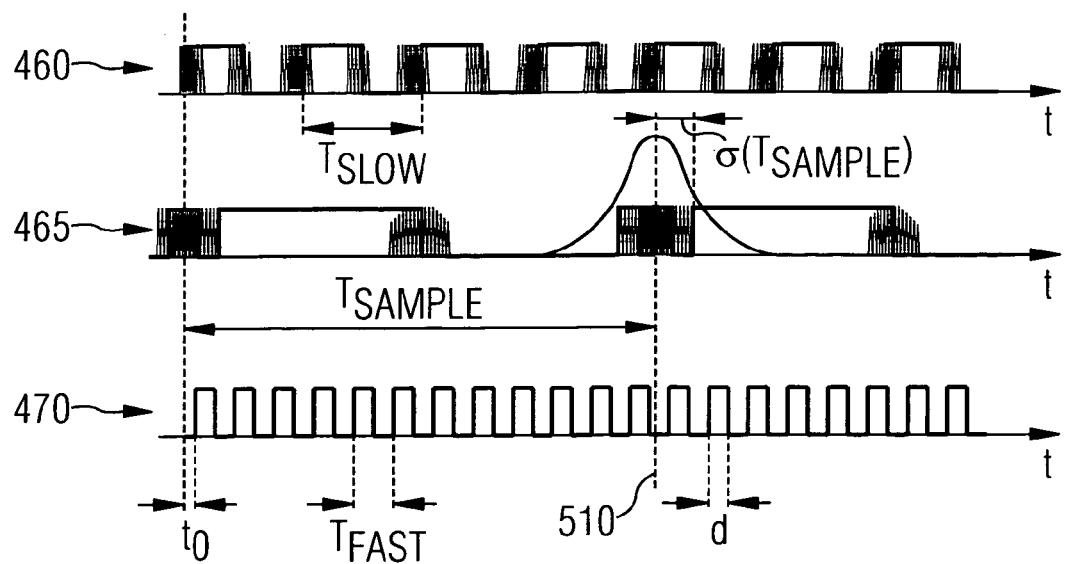
FIG. 5 shows graph of signals of a jittered oscillator noise source in the apparatus for FIG. 4.

FIG. 5 shows characteristics of the signals generated by the oscillators. The fast oscillator 410 generates a fast clock signal 470, the slow oscillator 420 generates a slow clock signal 460 and the sample signal 465 is obtained from the slow clock signal 460 by a pre-scaling. The fast clock signal 470 has a period $T_{FAST}$ and a duty cycle d. The slow clock signal 460 has a period $T_{SLOW}$ and edges of the slow clock signal 460 comprise a jitter. A period of the sample signal 465 is $T_{SAMPLE} = 2^{N_{pre}+1} T_{SLOW}$ and a standard deviation of the jitter of the sample signal 465 is $\sigma(T_{SAMPLE})$. The sample signal 465 is obtained from the slow clock signal 460 by pre-scaling the slow clock signal 460 by a factor defined in the means for pre-scaling 425. In the example here, the slow clock signal 460 is pre scaled by a factor of four, i.e. $N_{pre}=1$. Because the sample signal 465 is obtained from the slow clock signal 460 by a pre-scaling, the edge of the sample signal 465 comprises a jitter, too.

Frequency heating of the two free running oscillators 410 and 420 generates a non-white noise signal. This is especially a problem in a standard-cell based random word generator, where typically the jitter has a low intensity. To overcome this problem, the clock signals of the fast clock is synchronized in way to synchronize the edge of the sampling signal 465 and the edge of the fast clock signal 470. Edges of the sample signal 465 and the fast clock signal 470 are not synchronized here in FIG. 5. The line 510 indicates that the edge of the fast clock signal 470 occurs approximately a duty cycle d later than the edge of the sample signal 465. This synchronization is provided by the delayer 430.

Figure 6:
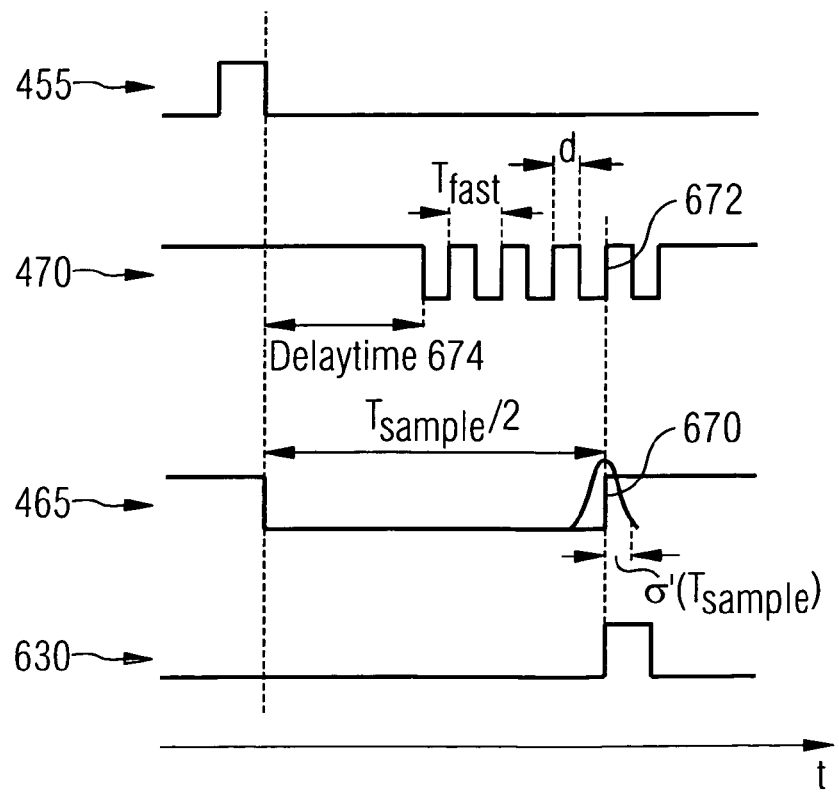
FIG. 6 shows graph of further signals of the apparatus of FIG. 4.

FIG. 6 shows the result of this synchronization and depicts the starting signal 455, a delayed fast clock signal 470, the sample signal 465 and a done signal 630. The slow clock signal 460 and hence the sample signal 465 is responsive to the start signal 455 and comprises a time period of $T_{SAMPLE}$. After a halt time period $T_{SAMPLE}/2$ a sampling edge 670 occurs.

The sampling edge 670, which is a first rising edge of the sample signal 465, is in the example shown in FIG. 6 aligned to an edge 672 of the fast clock signal 470. The synchronization or alignment of the sampling edge 670 and the edge 672 of the fast clock signal 470 is achieved by a delay time 674. The delay time 674 is controlled by the delayer 430 depending on the feed back signal from the feedback loop comprising the speed control 440 and the mean value calculator 435 in FIG. 4. Generally stated, the delayer 430 regulate the delay time such that the edge 672 most probably coincides with the edge 670.

The alignment of the sampling edge 670 and the edge 672 of the fast clock signal 470 avoids frequency beating and maximizes the random bit stream data quality, especially in presence of a low-jittered sampling clock signal. This improvement of the statistical quality is achieved only after a period set by the gap length $L_{skip}$. The done signal 630 generated in the sampler 445 is activated responsive to the sampling edge 670 and indicates a generation of a random bits as part of the raw bit sequence 100.

In the following the parameter $L_{skip}$ is determined from a statistical model of the noise source and post-processed sequences. In the following s[i] denotes the raw bit sequence.

Figure 7:
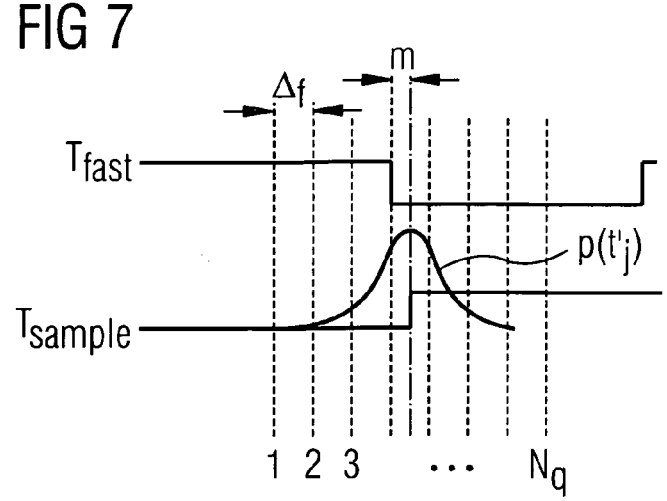
FIG. 7 quantization threshold in a oscillator sampling.

With reference to the block diagram in FIG. 4, $T_{sample}$ is affected by a jitter $t'_J$ which is assumed Gaussian with a probability density function:

$$p(t'_J) = \frac{1}{\sigma'_{t_J} \sqrt{2\pi}} e^{-\frac{(t'_J - m_0)^2}{2\sigma'_{t_J}}} \quad (3)$$

where $\sigma'_{t_J} = \sqrt{2^{N_{pre}+1}} \sigma_{t_J}$, being $\sigma_{t_J}$ the slow oscillator jitter, and $m \in [0, \Delta_f)$ is the position of the sampling edge with respect to the initial position of the quantization threshold (FIG. 7).

Normalizing with respect to $\Delta_f$, (3) becomes:

$$p(t'_J) = \frac{1}{\sigma_0 \sqrt{2\pi}} e^{-\frac{(t'_J - m_0)^2}{2\sigma_0}} \quad (4)$$

where $$\sigma_0 = \frac{\sigma'_{t_J}}{\Delta_f}$$

and $m_0 \in [0,1)$.

The probability of generating a logic one at the i-th time step is $$P\{s[i] = 1\} = \int_{-\infty}^{q(i)} p(t'_J) dt'_J \quad (5)$$

being $q(i) \in \lfloor 1, N_q \rfloor$ the current position of the quantization threshold. If s[i]=1, the bias compensation loop decreases the compensation delay by $\Delta_f$ thus moving the quantization threshold to the position q(i)−1 and reducing the probability of generating another one at the next time step. Symmetrically, if s[i]=0, the quantization threshold moves to the position q(i)+1. The number of possible positions for q is $N_1 = 2\lceil 4\sigma_0 \rceil + 1$.

Therefore, the resulting stochastic process is non-stationary where the position of the quantization threshold respresents the state of the process and it can be modeled as an homogenous discrete-time Markov chain whose one-step transition matrix $\Pi = \Pi[1]\{\pi_{l,k}\}$ is defined as:

$$\pi_{l,k} = P\{q(i+1) = l | q(i) = k\}, \quad (6)$$
$$\forall (l, k) \in [1, N_q]$$

where:

-continued $$\begin{cases} \pi_{1,1} = 0, \\ \pi_{1+1,l} = \int_{1}^{+\infty} p(t'_j) dt'_j, \forall l \in [1, N_q - 1] \\ \pi_{1-1,l} = \int_{-\infty}^{1} p(t'_j) dt'_j, \forall l \in [1, N_q - 1] \\ \pi_{1,l} = 0, \forall (l, k) \in [1, N_q] \times [1, N_q] | l \neq k + 1 \vee l \neq k - 1 \\ \pi_{2,1} = 1, \\ \pi_{N_q-1, N_q} = 1 \end{cases} \quad (7)$$

and, it holds:

$$\pi_{1+l,1} + \pi_{1-l,1} = 1, \forall l \in [2, N_q - 1] \quad (8)$$

The corresponding state diagram is depicted in FIG. 2 and, in order to evaluate Π, the parameters $\sigma_0$ and $m_0$, of the normalized jitter distribution are estimated by fitting the distribution of the length of runs evaluated on a raw sequence {s[i]} collected on the available prototype, with the corresponding distribution on a simulated sequence {ŝ[i]} obtained from the Markov model in FIG. 2.

Given a sequence {s[i]}, a run is a sub-sequence of {s[i]} consisting of consecutive 0's or consecutive 1's which is neither preceded nor succeeded by the same symbol. A run of 0' is called a gap, while a run of 1's is called a block. Let G[L], B[L] be the number of blocks and gaps, respectively, of length L in {s[i]} for each L, $1 \leq L \leq L_{max}$. The following error function is adopted:

$$\varepsilon = \sum_{L=1}^{L_{max}} \frac{(\hat{G}[L] - G[L])^2}{G[L]} + \sum_{L=1}^{L_{max}} \frac{(\hat{B}[L] - B[L])^2}{B[L]} \quad (9)$$

where, $\hat{G}[L]$, $\hat{B}[L]$ is the number of block and gaps, respectively, of length L in the simulated sequence {ŝ[i]}, and a nonlinear optimization algorithm is employed to find the values of $\sigma_0$ and $m_0$ that minimize (9).

Sequences of $10^6$ raw bits have been collected for prescaling factors between 2 and 32 ($N_{pre}=0,1\ldots,4$) and the fitting results are reported in Table 1 where the relative error $\epsilon_r$ is defined as:

$$\varepsilon_r = \frac{\varepsilon}{\sum_i (G[L]) + B[L])} \quad (10)$$

and the maximum run length $L_{max}$ is reported too.

TABLE 1

Estimated parameters of the normalized jitter distribution.

| $N_{pre}$ | $\sigma_0$ | $m_0$ | $L_{max}$ | $\epsilon$ | $\epsilon_r$ | $L_{skip}$ |
|---|---|---|---|---|---|---|
| 0 | 0.417 | 0.496 | 6 | 11519 | 1.43% | 4 |
| 1 | 0.588 | 0.498 | 7 | 5836 | 0.80% | 6 |
| 2 | 0.659 | 0.539 | 7 | 9069 | 1.28% | 8 |
| 3 | 1.349 | 0.563 | 11 | 5646 | 0.90% | 16 |
| 4 | 3.297 | 0.602 | 15 | 1097 | 0.20% | 40 |

From (4), (6), (7) and the values in Table 1, the one-step transition matrix Π is obtained. For example, if $N_{pre}=0$, the quantization threshold can assume $N_q=5$ possible positions and it results:

$$\Pi = \begin{bmatrix} 0 & 0.0002 & 0 & 0 & 0 \\ 1 & 0 & 0.1171 & 0 & 0 \\ 0 & 0.9998 & 0 & 0.8866 & 0 \\ 0 & 0 & 0.8829 & 0 & 1 \\ 0 & 0 & 0 & 0.1134 & 0 \end{bmatrix} \quad (11)$$

Figure 8:
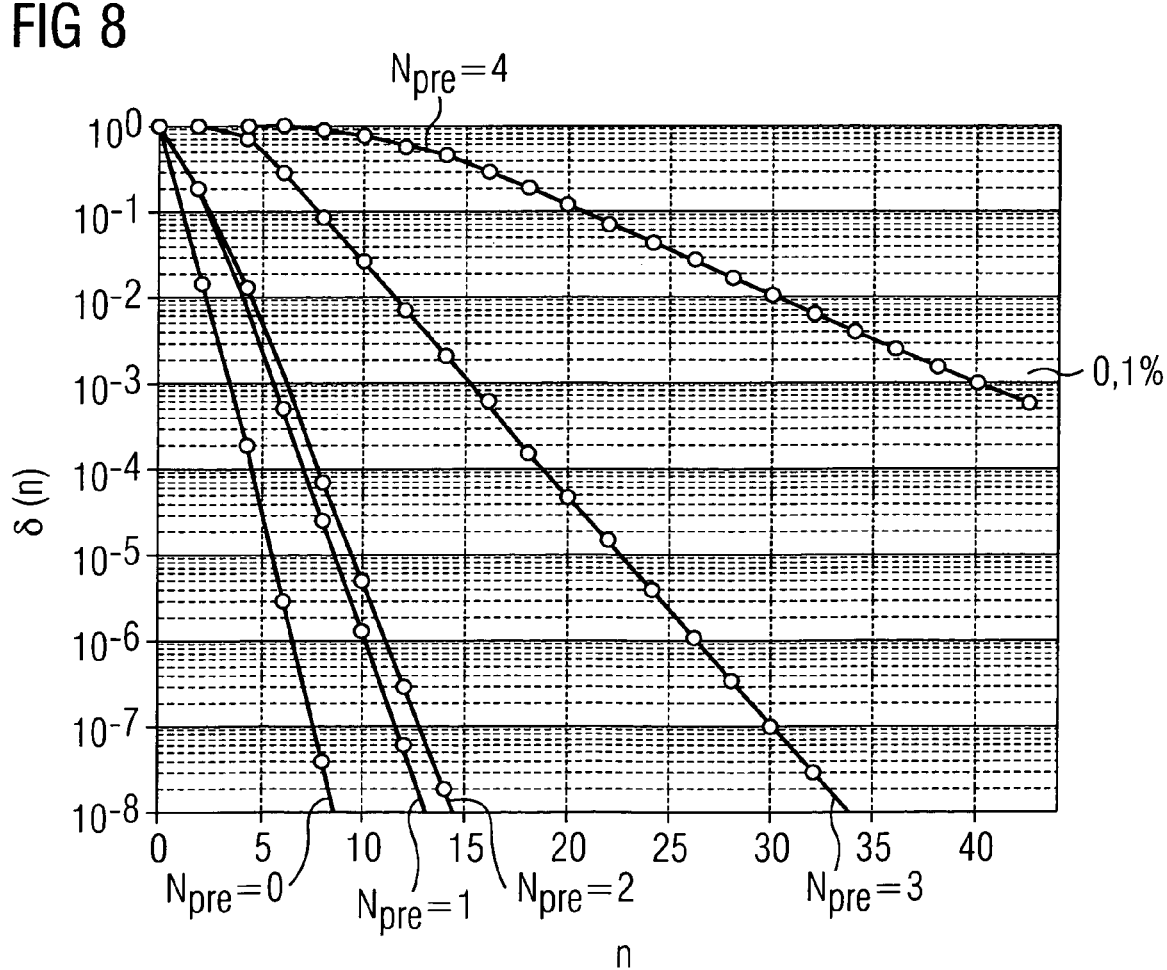
FIG. 8 convergence of $\Pi^n$ of the Markov chain model to the stationary distribution.

The maximum difference among even and odd column of Π" is defined as:

$$\delta(n) = \max \begin{cases} \max_{\substack{k'k''=1,3,\ldots,N_q \\ l=1,\ldots,N_q}} \{\Pi^n(l, k') - \Pi^n(1, k'')\}, \\ \max_{\substack{k'k''=2,4,\ldots,N_q-1 \\ l=1,\ldots,N_q}} \{\Pi^n(l, k') - \Pi^n(1, k'')\} \end{cases} \quad (12)$$

and the corresponding values are plotted in FIG. 8 for $N_{pre}=0$, 1, ..., 4. The values obtained for $L_{skip}$ are reported in Table 1 and refer to the case, that the stationary distribution (see discussion in the context of FIG. 2) has been reached to an accuracy of 0.1%, i.e. δ(n)<0.1%. FIG. 8 shows a horizontal line corresponding to this value, but this value can differ in other examples. In addition, FIG. 8 shows five graphs that correspond to five cases shown in Table 1. The graphs cross the horizontal line at a specific value for n and this value is $L_{skip}$, e.g. for the case of $N_{pre}=4$, the value for n is 40 and hence $L_{skip}=40$ as shown in Table 1.

An advantage of the above-described embodiment of the present invention is that this provides an apparatus for post-processing using an algorithm that can be used for a noise source that is not memory-less. This is possible by including a skip sequence comprising an $L_{skip}$-bit gap after which the correlation between generated sub-sequences of bits from the noise source is below an acceptable error. The post-processing algorithm provides a compression, so that the output random words comprises fewer bits (e.g. only one byte) than the raw bit sequence input into the apparatus for post-processing.

In further embodiments, the output random word is not compressed or the compression is different, e.g. the random word at the output 120 comprises a different number of bits, which are less or equal to the number of bits of the sequence of bits 170. Also the reset signal 190, which is used to improve the statistical quality of the generated random words, does not need to clear or it does not clear all memory cells of the LFSR. Also, the random word can, in further embodiments, be read out at a different stage of the process, i.e. not at the end of the $L_{skip}$-bit gap or the random word is read out not in one cycle, but over a period of cycles. As example, the random word could be read out at one memory cell and in each cycle one bit of the random word is read out, i.e. it is read out serially and not parallel. Also the random word can be obtained from any other set of memory cells. For the present invention, it is not important to use the input values of the first eight memory cells $X_0 \ldots X_7$ for obtaining the random word. In addition, in further embodiments the $c_j$ is not set to one, but (at least) one of the other parameters $c_1 \ldots c_{31}$ is set to one. Also, the clock speed of the LFSR 130 can differ from the clock speed with which the noise source 110 operates. In order to avoid duplications of bits, the clock speed of the noise source 110 is equal or faster than the clock speed of the LFSR 130.

The different embodiments of the present invention can also be combined in a different way than the one mentioned above. The deriving means 130 does need to comprise a linear feedback shift register. In further embodiments, the means for deriving 130 comprises a non-linear feedback shift register or it can comprise a Hash-module or another compressor.

Depending on certain implementation requirements of the inventive methods, the inventive methods can be implemented in hardware or in software. The implementation can be performed using a digital storage medium, in particular a disk or a CD having electronically readable control signals stored thereon, which cooperate with a programmable computer system such that the inventive methods are performed. Generally, the present invention is, therefore, a computer program product with a program code stored on a machine readable carrier, the program code being operative for performing the inventive methods when the computer program product runs on a computer. In other words, the inventive methods are, therefore, a computer program having a program code for performing at least one of the inventive methods when the computer program runs on a computer.

The invention claimed is:

1. An apparatus for post processing a raw bit sequence generated by a noise source, comprising:
 a derivation unit for deriving a random word from each bit sequence input into the derivation unit; and
 a skip unit for skipping skip sequences of consecutive bits of the raw bit sequence and inputting intervening sub-sequences of bits of the raw bit sequence between the skip sequences into the derivation unit.

2. The apparatus according to claim 1, wherein the derivation unit is resettable and wherein the apparatus further comprises:
 a controller for resetting the derivation unit before each derivation such that the derivation of a certain random word from a certain intervening sub-sequence is independent of the derivation of a random word from a preceding intervening sub-sequence input into the derivation unit prior to the certain intervening sub-sequence.

3. The apparatus according to claim 1, wherein the derivation unit is a compressor so that for each derivation the intervening sub-sequence input into the compressor comprises more bits than the random word derived therefrom.

4. The apparatus according to claim 1, wherein the derivation unit is a feedback shift register comprising a reset input for resetting the feedback shift register, a data input for a bit sequence and a data output for a random word.

5. The apparatus according to claim 1, wherein the apparatus further comprises the noise source, wherein the noise source generates, when activated, the raw bit sequence in a manner such as a discrete time homogeneous Markov chain model with a predetermined number of states.

6. The apparatus according to claim 5, wherein the skip unit is designed such that the skip sequences extend over a fixed number of consecutive bits exceeding a number of state transitions after which a transition matrix of the Markov chain model approaches a stationary distribution to an accuracy of less than 1%.

7. The apparatus for generating a random word, comprising:
 a noise source comprising a raw bit sequence output;
 a skip unit comprising an input coupled to the raw bit sequence output and an output; and
 a compressor comprising an input coupled to the output of the skip unit and a random word output.

8. The apparatus according to claim 7, wherein the compressor is resettable and wherein the apparatus further comprises:
 a controller for resetting the compressor.

9. The apparatus according to claim 7, wherein the compressor is a feedback shift register comprising a reset input, a data input and a data output.

10. The apparatus according to claim 7, wherein the apparatus further comprises the noise source, wherein the noise source generates, when activated, the raw bit sequence in a manner such as a discrete time homogeneous Markov chain model with a predetermined number of states.

11. The apparatus according to claim 10, wherein the skip unit is designed such that the skip sequences extend over a fixed number of consecutive bits exceeding a number of state transitions after which a transition matrix of the Markov chain model approaches a stationary distribution to an accuracy of less than 1%.

12. A random word generator, comprising:
 a noise source comprising a raw bit sequence output and being operative in a manner such as a discrete time homogeneous Markov chain model;
 a feedback shift register comprising a reset input, a data input and a data output;
 a multiplexer comprising a control input, a fixed signal input, a raw bit sequence input coupled to the raw bit sequence output and a multiplexer output coupled to the data input of the feedback shift register; and
 a controller comprising a first control output coupled to the reset input of the feedback shift register, and a second control output coupled to the control input of the multiplexer and being operative in cycles so that, in a preceding cycle, the feedback shift register is reset and the multiplexer provides a first sub-sequence of bits of the raw bit sequence from the raw bit sequence input to the multiplexer output and couples the fixed signal input with the multiplexer output during a skip sequence of consecutive bits following the first sub-sequence, and, in a subsequent cycle, the feedback shift register is reset and the multiplexer provides a second sub-sequence of bits of the raw bit sequence following the skip sequence from the raw bit sequence input to the multiplexer output, wherein data at the data output of the feedback shift register resulting from the first sub-sequence of bits represents a first random word of the preceding cycle and data at the data output of the feedback shift register resulting from the second sub-sequence of bits represents a second random word of the subsequent cycle.

13. The randomword generator according to claim 12, wherein the feedback shift register comprises a compressor.

14. The random word generator according to claim 12, wherein the skip sequences extend over a fixed number of bits, the fixed number of bits exceeding a number of state transitions after which a transition matrix of the Markov chain model approaches a stationary distribution to an accuracy of less than 1%.

15. A method for post processing a raw bit sequence generated by a noise source, comprising:
 skipping skip sequences of consecutive bits of the raw bit sequence; and
 deriving random words from sub-sequences of bits of the raw bit sequence between the skip sequences.

16. The method according to claim 15, wherein the derivation is performed such that a resetting is performed before each derivation such that the derivation of a certain random word from a certain intervening sub-sequence is independent of the derivation of a random word from a preceding intervening sub-sequence.

17. The method according to claim 15, wherein the step of deriving a random word is performed by compressing the sub-sequences of bits, which are input into the derivation unit such that the random words comprise fewer bits than the sub-sequences of bits.

18. The method according to claim 15, wherein the step of deriving a random word comprises using a resettable feedback shift register with a data input for a bit sequence and a data output for the random words.

19. The method according to claim 15, wherein the method further comprises using a noise source, generating the raw bit sequence in a manner such as a discrete time homogeneous Markov chain model with a predetermined number of states.

20. The method according to claim 15, wherein the skip sequences extend over a fixed number of bits, the fixed number of bits exceeding a number of state transitions after which a transition matrix of the Markov chain model approaches a stationary distribution to an accuracy of less than 1%.

21. A method for generating random words using a noise source activatable to generate a raw bit sequence in a manner such as a discrete time homogeneous Markov chain model, a feedback shift register being resettable, and a multiplexer, comprising:

in a first cycle:

resetting the feedback shift register;

controlling the multiplexer to input a first sub-sequence of bits of the raw bit sequence into a data input of the feedback shift register; and inputting a fixed signal into the data input of the feedback shift register during a skip sequence of consecutive bits following the first sub-sequence of bits; and in a second cycle:

resetting the feedback shift register; and controlling the multiplexer to input a second sub-sequence of bits of the raw bit sequence following the skip sequence into the data input of the feedback shift register, wherein data at a data output of the feedback shift register resulting from the first sub-sequence of bits represents a first random word for the first cycle and data at the data output of the feedback shift register resulting from the second sub-sequence represents a second random word for the second cycle.

22. The method according to claim 21, wherein the method further comprises compressing the first sub-sequence of bits input into the feedback shift register in such a way that the first random word comprises fewer bits than the first sub-sequence of bits.

23. The method according to claim 21, wherein the step of inputting a fixed signal is performed such, that the skip sequence extends over a fixed number of bits, the fixed number of bits exceeding a number of state transitions after which a transition matrix of the Markov model approaches a stationary distribution to an accuracy of less than 1%.

24. A computer readable digital storage medium having stored thereon a computer program having a program code for performing, when running on a computer, a method for post processing a raw bit sequence generated by a noise source, comprising:

skipping skip sequences of consecutive bits of the raw bit sequence; and deriving random words from sub-sequences of bits of the raw bit sequence between the skip sequences.

25. An apparatus for post processing a raw bit sequence generated by a noise source, comprising:

deriving means for deriving a random word from each bit sequence input into the deriving means; and skipping means for skipping skip sequences of consecutive bits of the raw bit sequence and inputting intervening sub-sequences of bits of the raw bit sequence between the skip sequences into the deriving means.

* * * * *